United States Patent [19]

Megyesi

[11] Patent Number: 5,544,230
[45] Date of Patent: Aug. 6, 1996

[54] METHOD AND APPARATUS FOR RECORDING AND PLAYING BACK A TELEMARKETING SALES PRESENTATION

[76] Inventor: Timothy J. Megyesi, 4001 N. 32nd Way, Phoenix, Ariz. 85018

[21] Appl. No.: 102,401

[22] Filed: Aug. 5, 1993

[51] Int. Cl.$^6$ .................................................. H04M 11/10
[52] U.S. Cl. .............................. 379/67; 379/85; 379/442; 379/395; 379/421
[58] Field of Search ...................... 379/84, 67, 89, 379/395, 360, 442, 88, 94, 96, 91, 92, 214, 79, 421, 265, 266, 82, 73, 74, 87, 438, 85

[56] References Cited

U.S. PATENT DOCUMENTS

| | | | |
|---|---|---|---|
| 4,071,698 | 1/1978 | Barger, Jr. et al. | 379/84 |
| 4,446,335 | 5/1984 | Lee et al. | 379/85 |
| 4,605,975 | 8/1986 | Beaman | 379/87 |
| 4,697,282 | 9/1987 | Winter et al. | 379/84 |

OTHER PUBLICATIONS

Lifestyle Fascination Catalog, Jul. 1, 1993, p. 26 (bottom).

*Primary Examiner*—Jeffery Hofsass
*Assistant Examiner*—Scott Wolinsky
*Attorney, Agent, or Firm*—Richard E. Oney; James Duffy

[57] ABSTRACT

A method and apparatus for recording and playing back a sales presentation is disclosed. A telephone interface device is connected to a telephone base, handset and recorder to permit recordation of a sales message using the telephone mouth piece as the recorder microphone. The recorded message has the same sound quality when transmitted over the phone lines as does a normal, live transmission. Transit to and from live and recorded voice is undetected by the party hearing the sales presentation over the phone. Use of the telephone interface device and the recorded sales presentation precludes fatigue and discouragement on the part of the telemarketing sales representative in the face of repeated repetitions of the same sales message and frequent rejections by prospective customers.

3 Claims, 1 Drawing Sheet

METHOD AND APPARATUS FOR RECORDING AND PLAYING BACK A TELEMARKETING SALES PRESENTATION

BACKGROUND

1. Technical Field of the Invention

The invention relates to the field of Telemarketing wherein a sales presentation is offered to a prospective customer over the telephone. In particular, the invention relates to apparatus and method for making a personalized, telephonic sales presentation supplemented by pre-recorded segments.

2. Prior Background Art

Most people have experienced the sense of frustration which arises when a telephone call, received at an inopportune time, is determined to originate at a telemarketing operation. Your supper is getting cold, or the baby's diaper needs changing, or the most important segment of your TV program is just being presented, and some inconsiderate person calls you on the phone to attempt to sell you something. It can be difficult to respond civilly and politely. Who do these people think they are?

Actually, they are persons from all walks of life, each one attempting to earn a salary, most with a specific, personal goal in mind. There's shoes, a vacation, education, food for the table and money for rent. In general, the salary they earn is proportionate to the number of sales they make to the prospects to whom they place their telephone calls. So, with goals in mind, high hopes and enthusiasm, they begin their work shift and place their first call. And you answer.

The resulting, shared experience is apt to be unpleasant for you and unprofitable for the telemarketing sales representative. After several rejections, the sales representative's hopes may dim and her enthusiasm begin to wane. She must exert an effort to key herself up for the next call, to sound pleasant and alert, and excited about her product. Even on a good night, with above average sales, she grows tired of repeating the same message, over and over and over, each time the phone is answered.

It is an object of the invention to provide means and method for reducing the fatigue and stress a telemarketing sales representative experiences as he calls successive prospects, makes the same sales presentation to each prospect called, and experiences repeated rejections in the course of attempting to make those presentations.

It is a further objective of the invention to provide means and method to enable the sales representative to make each presentation identical, from first to last, and with the same level of clarity and enthusiasm throughout his work shift.

It is further intended that these objectives shall be achieved while enabling the sales representative to respond instantly and personally to questions and comments of the prospect called.

SUMMARY DESCRIPTION OF THE INVENTION

The invention is disclosed as an apparatus and a method for preparing and presenting a recorded sales presentation for use in telemarketing. The method comprises the steps of: connecting a telephone mouth piece to the input of a recording device; using the telephone mouth piece as a microphone for recording a telemarketing sales presentation on the recording device; and playing back the recorded sales presentation over a telephone by connecting sound signals originating from the recorded sales presentation to the voice signal transmission lines of a telephone.

The step of connecting a telephone mouth piece to the input of a recording device comprises the step of connecting the voice signal transmission lines of a telephone to the recording input of the recording device; while the step of using the telephone mouth piece as a microphone comprises the further step of isolating the mouth piece from telephone line background noise so that a recording of the sales presentation with the sound quality of a live telephone transmission will be achieved.

Several approaches are suggested for isolating said mouth piece. For example, placing a telephone call to a telephone from which sound transmission is inhibited, and then recording the sales presentation through the mouth piece of the telephone from which the telephone call originated. Or, alternatively, the step of isolating the mouth piece comprises the step of independently actuating the mouth piece independent of telephone utility line power.

The step of playing back the recorded sales presentation over a telephone comprises the step of first adjusting the sound level of the recorded sales presentation to be generally equivalent to the sound level of the live voice sound level of a telemarketing sales representative who will be using the recorded sales presentation in the course of communicating with a prospective customer. The sound levels of the recorded presentation and the sales representative's live voice may be equalized by placing a telephone call to a person; alternately transmitting the sales representative's live voice and recorded sales presentation communications to the person; and, adjusting the sound level of the recorded sales presentation relative to the sound level of the sales representative's live voice until the live and recorded transmission levels are equivalent, per the instructions of the person.

The step of connecting a telephone mouth piece to a recording device is further disclosed by the steps of providing an interface device; making a serial insertion of the interface device in the line between a telephone base and handset making the wires of the line accessible within the device, the wires comprising a first pair connecting the base to the ear piece of the handset and a second pair connecting the base to the mouth piece of the handset; and, connecting a third pair of wires across the second pair and outputting the third pair of wires from the interface device to a recording device for recording voice signals generated by the mouth piece.

The step of connecting the third pair of wires to a recording device comprises the steps of connecting the third pair of wires to a record/playback device; and making the connection a selective connection to a recording input of the record/playback device. Playing back the recorded sales presentation over a telephone comprises the further steps of: disconnecting the third pair of wires from the recording input of the record/playback device; selectively connecting the third pair of wires to an output of the record playback device; and playing the recorded sales presentation on the record/playback device.

A further step discloses connecting an amplifier into the first pair of wires for amplifying the incoming sound signals intended for audible reproduction at the ear piece of the handset.

The apparatus for preparing and presenting a recorded sales presentation comprises the telephone base, the interface device, the telephone mouthpiece, the telephone earpiece and the record/playback device configured as described above.

DETAILS OF BEST MODE FOR CARRYING OUT THE INVENTION

Figure 1:
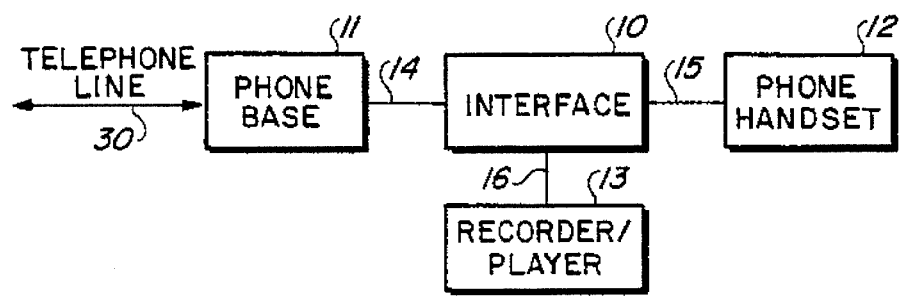
FIG. 1 is a block diagram of the system employing an interface between a telephone and a record/playback device.

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

The apparatus and method of the invention employs an interface device to connect a pre-recorded sales presentation message on to the telephone lines being used by a telemarketing sales representative. Ideally, the recordation of the sales message will have been achieved using the telephone instrument utilized by the telemarketing sales representative. With reference to FIG. 1, phone base 11 is connected to the telephone utility line in conventional manner by means of line 30. An interface device 10 is inserted between phone base 11 and phone handset 12 using lines 14 and 15 to achieve the interconnection. A recorder/player device, for example tape cassette recorder/player 13, is connected to telephone base 11 and handset 12 via interface device 10 and line 16. As used herein, the term "handset" includes a handset as well as a headset or other such structure having a telephone ear piece and a mouthpiece.

Figure 2:
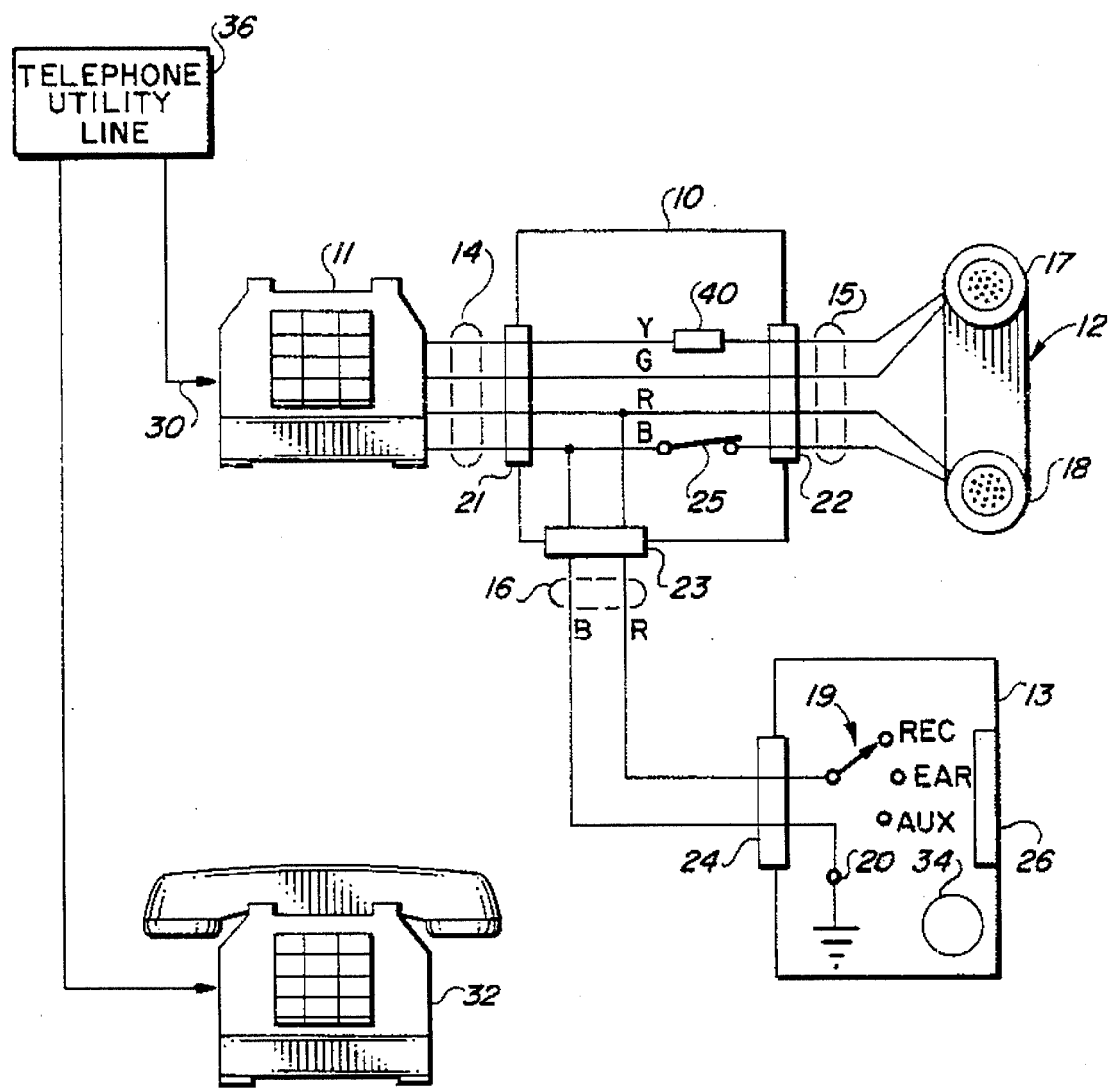
FIG. 2 is a pictorial block diagram, similar in content to that of FIG. 1, but having schematic details of the wiring of the telephone interface into the system.

Greater detail is shown in FIG. 2. In a conventional US wiring of a telephone, four-wire interconnection lines are used. Yellow wire Y and green wire G connect ear piece 17 of handset 12 to telephone base 11. Red wire R and black wire B connect the mouthpiece 18 of handset 12 to base 11. The connection of interface device 10 between base 11 and handset 12 preserves this standard wiring convention. As will be understood by those skilled in the art, this wiring color code convention is preserved for convenience and is not mandatory.

As shown in FIG. 2, line 14 connects base 11 to interface device 10. The connection of line 14 to interface device 10 is preferably by means of a standard modular telephone connector 21. Similarly, line 15, connecting handset 12 to interface device 10, is preferably connected to device 10 using a modular phone connector 22. Wires Y, G, R and B pass through device 10 to preserve the interconnection of phone base 11 to handset 12.

A two-wire pair, line 16, made up of a second red wire R and a second black wire B, connects device 10 to recorder 13. Wires R and B in line 16 are connected to wires R and B, respectively, in device 10. Wire B of line 16 is connected to the common or ground connection of recorder 13. Wire R of line 16 is selectively connected to the record input (Rec) or the auxiliary input (Aux) of recorder 13 so that words spoken into mouthpiece 18 of handset 12 will be recorded, on a cassette tape 26, by recorder 13. In the above configuration, wires Y and G are connected between an audio output of the base 11 and the telephone earpiece 17 for transmitting audio signals from the telephone base 11 to the telephone earpiece 17, wires R and B are connected between an audio input of the base 11 and the telephone mouthpiece 18 for receiving audio signals from the telephone mouthpiece 18 at the telephone base 11, and an additional pair of wires R and B are connected from the audio input of the base 11 to an audio input of the record/playback device 13.

Mouthpiece 18 is activated when handset 12 is removed from the cradle of base 11 while line 30 is connected to the telephone utility line 36. Attempting to record on tape 26 using mouthpiece 18 as a microphone will produce a poor quality of recording unless a situation is set up in which mouthpiece 18 is actuated under actual or simulated conditions representative of those present when an actual phone call is being made. To achieve these conditions, the telemarketing sales representative may first telephone an associate and request that he cover the mouthpiece of his phone while the telemarketing sales representative records the sales presentation on tape 26 using mouthpiece 18 as a recording microphone.

Alternatively, the associate may be requested to disconnect his handset from his telephone base for a time sufficient to allow the telemarketing sales representative to complete recordation of the sales presentation.

By so simulating of the conditions existing when an actual phone call is being made, a high quality sound recording can be made which closely represents the sound quality of the normal, live voice phone transmission.

Alternatively, wire R of line 16 will be selectively connected to the earphone audio output connector (Ear) of recorder 13 so that information recorded on cassette tape 26 may be played back to device 10 for transmission over telephone line 30 via phone base 11. So that background noise picked up by mouthpiece 18 will not be transmitted during the playback of cassette tape 26, switch 25 in device 10 will be opened to isolate mouthpiece 18.

Connection of line 16 to device 10 and recorder 13 is preferably achieved by means of conventional audio jack connectors 23 and 24, respectively. The selective connection of wire R of line 16 to any one of the Rec, Aux or Ear ports of recorder 13 may most simply be achieved by connecting jack connection 24 directly to the selected port. However, it is preferred that a three pole, rotary switch 19 be incorporated so that the connection may be selectively made by simple operation of switch 19.

The methodology for use of interface device 10 is as follows: The telemarketing sales representative telephones an associate and asks the associate to shield or disconnect his handset's mouthpiece to inhibit the introduction of background noise onto the recording to be made. Switch 19 is operated so as to connect wire R to either the Rec or Aux input port of recorder 13. The telemarketing sales representative records the core content of her sales presentation on recorder 13 using telephone mouthpiece 18 as the microphone. This assures that the telemarketing sales representative's voice recording on cassette tape 26 will have the same sound quality as that of a conventional, "live" telephone voice transmission. It should be noted that for the convenience of using the recorded sales presentation, a leaderless cassette tape should be utilized for speed and consistency of startup of the presentation following rewind of tape 26.

The telemarketing sales representative then positions switch 19 at the Ear position so as to direct the audio output from recorder 13 to interface device 10 for transmission over phone line 30. The telemarketing sales representative next prepares the record/playback device for playback and places a call to a nearby phone 32 for purposes of setting the audio output level of the recorded message to be generally the same as that of the telemarketing sales representative's normal, live voice transmission level. Such preparation includes, for example where the record/playback device is a cassette player/recorder, installing and rewinding the cassette tape. An associate alternately listens to the recorded message and the telemarketing sales representative's live voice transmission and advises the telemarketing sales representative to adjust the audio output level of recorder 13 by audio output level control 34 so that the recorded voice is indistinguishable from the live voice transmission.

Thereafter, the telemarketing sales representative, while making a presentation to a prospective customer, may readily switch between recorded presentation and actual live voice transmission without the prospect being aware that a recorded playback is being employed. This enables the telemarketing sales representative to make live contact with the prospect when the phone is answered by the prospective customer. Thereafter the telemarketing sales representative may smoothly transition to the pre-recorded sales message without the prospect being aware that a machine presentation is being made. Should the prospect interrupt the recorded presentation with a comment or question, the telemarketing sales representative may immediately stop the playback of the recorded presentation and continue in her normal, live voice.

During experimental trials of the invention it has been found that such interruptions of the pre-record presentation seldom occur. This is explained by an important, practical aspect of the recorded message. The message is recorded with optimum timing and enthusiasm neither of which wanes with repetition. The telemarketing sales representative opens and closes the presentation "live" and transits unnoticed to and from the recorded sales message. The enthusiastic flow of the recorded presentation tend to inhibit interruptions by the prospect, whose question and comments may then be responded to during the live, closing portion of the presentation.

It should be noted that standard responses to common objections can be anticipated and pre-recorded for use during a presentation. Use of interface device 10 permits instant recording of customer sales verifications as well as recordation of a participant's responses made during the course of a survey telemarketing presentation.

The effectiveness of the telemarketing sales representative may be further bolstered by adding an amplifier 40 into the ear piece circuitry, wires Y and G, of interface device 10. This will enable the telemarketing sales representative to hear clearly the voice of a frail or elderly customer. See amplifier 40 placed so as to amplify the signal on wires Y and G of device 10 in FIG. 2.

It may also be noted that interface 10 and recorder 13 may be utilized to play background music or the like over any phone while a caller is on hold on the phone.

What has been disclosed is a telephone interface for use with a pre-recorded sales presentation. The interface permits recordation of the sales message using the telephone mouth piece as the recorder microphone. The recorded message has the same sound quality when transmitted over the phone lines as does a normal, live transmission. Transit to and from live and recorded voice is undetected by the party hearing the sales presentation over the phone. Use of the telephone interface and the recorded sales presentation precludes fatigue and discouragement on the part of the telemarketing sales representative in the face of repeated repetitions of the same sales message and frequent rejections by the prospective customers.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, That which is claimed is:

1. A method for recording and playing back a sales presentation for use in telemarketing, the method comprising the steps of:

providing a first telephone having an audio output for transmitting audio signals from the first telephone's base to the first telephone's earpiece and an audio input for receiving audio signals at the first telephone's base from the first telephone's mouthpiece;

serially inserting an interface device between said first telephone's base and said first telephone's earpiece and mouthpiece, said interface device having a first pair of wires for connecting said first telephone's audio output to said first telephone's earpiece, a second pair of wires for connecting said first telephone's audio input to said first telephone's mouthpiece, a third pair of wires for also connecting said first telephone's audio input to a switch of a record/playback device which selectively switches between a recording input and a playback output of the record/playback device, and selective inhibiting means, inserted within one of said second pair of wires, which selectively inhibits sound transmission from said first telephone's mouthpiece without disturbing the connections provided by said first and third pair of wires;

completing a telephone call from said first telephone to a second telephone;

selectively switching said switch to the recording input position;

inhibiting sound transmission from the second telephone's mouthpiece;

recording a telemarketing sales presentation input into said record/playback device via said first telephone's mouthpiece;

selectively switching said switch to the playback output position; and playing back said recorded sales presentation via said playback output.

2. The method of claim 1, further comprising the step of inhibiting sound transmission from said first telephone's mouthpiece via said selective inhibiting means.

3. The method of claim 1, wherein said interface device further includes an amplifier inserted within one of said first pair of wires such that the amplifier's input is coupled to said first telephone's audio output and the amplifier's output is coupled to said first telephone's earpiece.

* * * * *